(12) United States Patent
Kammerer

(10) Patent No.: US 6,510,123 B1
(45) Date of Patent: Jan. 21, 2003

(54) RECORDING OR REPRODUCTION APPARATUS WITH A MOUNT FOR DISC-TYPE RECORDING MEDIA

(75) Inventor: Manferd Kammerer, St. Georgen (DE)

(73) Assignee: Thomson Licensing, S.A., Boulogne Billancourt (FR)

( * ) Notice: Subject to any disclaimer, the term of this patent is extended or adjusted under 35 U.S.C. 154(b) by 0 days.

(21) Appl. No.: 09/470,416

(22) Filed: Dec. 22, 1999

(30) Foreign Application Priority Data

Dec. 22, 1998 (DE) .......................................... 198 59 356

(51) Int. Cl.$^7$ .............................................. G11B 23/00
(52) U.S. Cl. ....................................................... 369/271
(58) Field of Search ................................ 369/270, 271, 369/75.1

(56) References Cited

U.S. PATENT DOCUMENTS

| | | | |
|---|---|---|---|
| 4,514,839 A | 4/1985 | Eisemann | 369/270 |
| 4,649,532 A | * 3/1987 | Aldenhoven | 369/270 |
| 5,555,233 A | 9/1996 | Yano et al. | 369/270 |
| 5,761,186 A | 6/1998 | Mushika et al. | 369/271 |
| 5,774,445 A | 6/1998 | Sawi et al. | 369/270 |

FOREIGN PATENT DOCUMENTS

| | | |
|---|---|---|
| DE | 3211360 A1 | 10/1983 |
| DE | 19753690 A1 | 7/1998 |
| EP | 0030754 | 6/1981 |
| EP | 0183310 A1 | 6/1986 |
| EP | 0553034 A2 | 7/1993 |
| FR | 2078456 | 11/1971 |
| WO | WO90/00798 | 1/1990 |

OTHER PUBLICATIONS

European Search Report citing the above-listed references: AA, AB AM, AN, AO, and AP.
German Search Report citing the above-listed references: AA, AM, AN, and AO.
*corresponds to cited German reference DE3211360A1.
**translation of the abstract is enclosed.

* cited by examiner

*Primary Examiner*—Allen Cao
(74) *Attorney, Agent, or Firm*—Joseph S. Tripoli; Joseph J. Laks; Robert D. Shedd

(57) ABSTRACT

Recording or reproduction apparatus with a mount for disc-type recording media which enables the recording medium to be placed and removed with forces that are to be applied exclusively in the directions of movement yet are different, compensates for tolerances of the centering hole of the recording medium, applies a constant holding force even over a relatively long period of time, and has a small number of individual parts. A first embodiment, includes a mount which has a spring element formed by a spring toothed disc in conjunction with balls or pot-type springs. In a second embodiment pot-type springs arranged with a prestress are provided, by a member of which pot-type springs a recording medium is held and centered on the disc turntable.

9 Claims, 5 Drawing Sheets

RECORDING OR REPRODUCTION APPARATUS WITH A MOUNT FOR DISC-TYPE RECORDING MEDIA

FIELD OF THE INVENTION

The invention relates to a recording or reproduction apparatus with a mount for disc-type recording media, which mount retains the recording medium with means provided on the disc turntable.

BACKGROUND OF THE INVENTION

Disc turntables with a hub penetrating through a centering hole in the recording medium in recording or reproduction apparatuses which have means for retaining the recording medium on the disc turntable have been known for a long time. Thus, as early as in DE-GM 7005274, a mount for records was proposed, which holds a record both radial outwardly and downwardly on the disc turntable. Corresponding embodiments of the known mount for records are illustrated in FIGS. 1 to 4. Individual spring elements are arranged at the periphery of the hub of the disc turntable, the record being pressed onto the disc turntable in the centering hole by the said spring elements. Balls are provided as spring elements, which balls partly project through openings at the periphery of the hub and, at the inwardly projecting part, bear resiliently on a rubber body. What is disadvantageous is that a force required to overcome the spring resistance has the same magnitude in both directions, that is to say during emplacement and removal of the recording medium, and different spring forces are generated by a rubber body on account of fatigue phenomena and environmental influences.

As an alternative, in the case of a disc turntable composed of plastic capable of being injection-molded, tongue-shaped springs are provided in radial slots at the periphery of the hub, the undercut limb end of which springs projects radial above the periphery of the hub and is at a distance from the disc turntable corresponding to the thickness of the record. During the emplacement of the record, the tongue-shaped springs spring back and then settle on the record. The recording medium can be removed only by applying a force perpendicularly to the direction of movement of the disc turntable, thereby rendering interchange-ability of the recording medium more difficult. The mount does not compensate for tolerances of the centering hole of the recording medium.

SUMMARY OF THE INVENTION

The object of the invention is to provide a recording or reproduction apparatus with a mount for disc-type recording media which enables the recording medium to be emplaced and removed with forces that are to be applied exclusively in the directions of movement yet are different, compensates for tolerances of the centering hole of the recording medium, applies a constant holding force even over a relatively long period of time, and has a small number of individual parts.

This object is achieved by means that are specified in independent claims; advantageous designs and developments are specified in dependent claims.

It is an aspect of the invention that despite a comparatively small force during the emplacement of the recording medium on the disc turntable, a large holding force is generated for the recording medium on the disc turntable and its interchangeability is nevertheless enabled using simple means.

According to the invention, a spring toothed disc for holding the recording medium on the disc turntable is arranged in a hub of the disc turntable, which hub penetrates through a centering hole in the recording medium and is designed in a pot-shaped manner, the teeth of which spring toothed disc are oriented at an angle to a plane formed by the disc turntable, the said angle preferably being other than 90 degrees. The spring toothed disc is arranged on an inner hub of the pot-shaped hub and can be used both in connection with balls and in connection with tongue-shaped pot-type springs as a spring element for holding the recording medium on the disc turntable. The teeth of the spring toothed disc are arranged in pockets of the pot-shaped hub in a manner secure against rotation and, with spring elements arranged at the periphery of the hub, exert a holding force having a plurality of different components on a recording medium on the disc turntable. The components of the force proceeding from the spring elements are determined by the angle at which the teeth of the spring toothed disc are arranged with respect to the plane formed by the disc turntable. As a result, in an advantageous manner, a force component provided for centering the recording medium on the disc turntable is generated which is not equal to the holding force and, consequently, in the direction of movement, an emplacement force is generated which is not equal to the removal and/or holding force, without a force having to be applied perpendicularly to the direction of movement or an unlocking arrangement having to be activated.

In the case of an embodiment provided with balls as a spring element, the teeth of the spring toothed disc bear, at an angle to a plane formed by the disc turntable, the said angle being other than 90 degrees, on the balls, which partly project through openings at the periphery of the hub, and thereby determine the spring force components.

In the case of an embodiment provided with tongue-shaped pot-type springs as a spring element, the teeth of the spring toothed disc likewise bear at an angle on the tongue-shaped pot-type springs and latching lugs are provided on the tongue-shaped pot-type springs, the said latching lugs furthermore having different inclination in the direction to and from he disc turntable. The force components exerted on the recording medium for the centering and holding of the recording medium on the disc turntable are additionally influenced by the inclination of these latching lugs. By virtue of the fact that the latching lugs have an inclination, which does not run parallel to a plane formed by the disc turntable, it is not necessary to unlock the recording medium with a force that has to be additionally applied perpendicularly to the direction of removal. With a force directed in the direction of removal, by way of the inclination of the latching lugs a force which enables the recording medium to be removed is exerted on the tongue-shaped pot-type springs supported on the spring toothed disc.

The spring toothed disc arranged on an inner hub of the pot-shaped hub of the disc turntable is preferably fixed by holding-down devices of a closure cover which engages in cutouts in the pot-shaped hub.

The mount for the recording medium on the disc turntable comprises a small number of individual parts, enables the emplacement and removal of the recording medium with different forces that are to be applied exclusively in the directions of movement and compensates for tolerances of the centering hole in the recording medium with a spring toothed disc. The production of the spring toothed disc from phosphor bronze or spring strip steel ensures that the mount applies a constant holding force even over a relatively long period of time.

A second embodiment is formed exclusively by pot-type springs which are arranged upright under a prestress at the periphery of the hub of the disc turntable. For this purpose, cutouts are provided in a latching disc, which forms the cover of the pot-shaped body and is anchored with latching webs in the bottom of the pot-shaped plastic body, into which cutouts engages a shoulder at that end of the pot-type spring which carries the lug. The elastic pot-type springs are initially produced with an angle with respect to the bottom of the pot-shaped body 28 that exceeds 90 degrees. During the mounting of the latching disc which forms the cover, the pot-type springs are then forced back until they latch into the cutouts, with the result that the pot-type springs have a prestress. With the prestress, a large spring force is advantageously achieved in spite of small spring excursions, which spring force, for a number of applications, is already large enough to hold and to center the recording medium on the disc turntables even without the support by the spring toothed disc. With a basic construction, it is thereby possible to produce different disc turntables that exert on the recording medium a holding and centering force, which corresponds to the respective purpose of use. The purpose of use is determined in particular by the rotational speed range in which the disc turntable is intended to be used.

The invention is explained in more detail below with reference to the drawings.

DETAILED DESCRIPTION OF THE PREFERRED EMBODIMENTS

Figure 1:
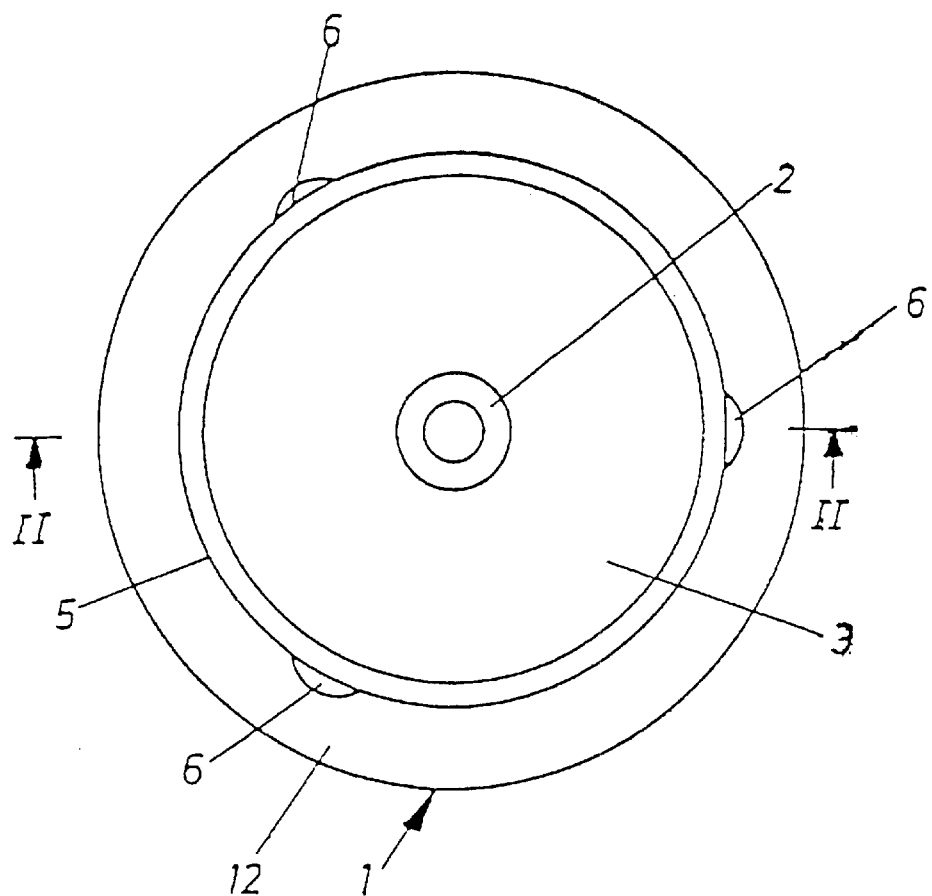
FIG. 1: shows a schematic sketch of a first embodiment of a known mount in plan view.
Figure 2:
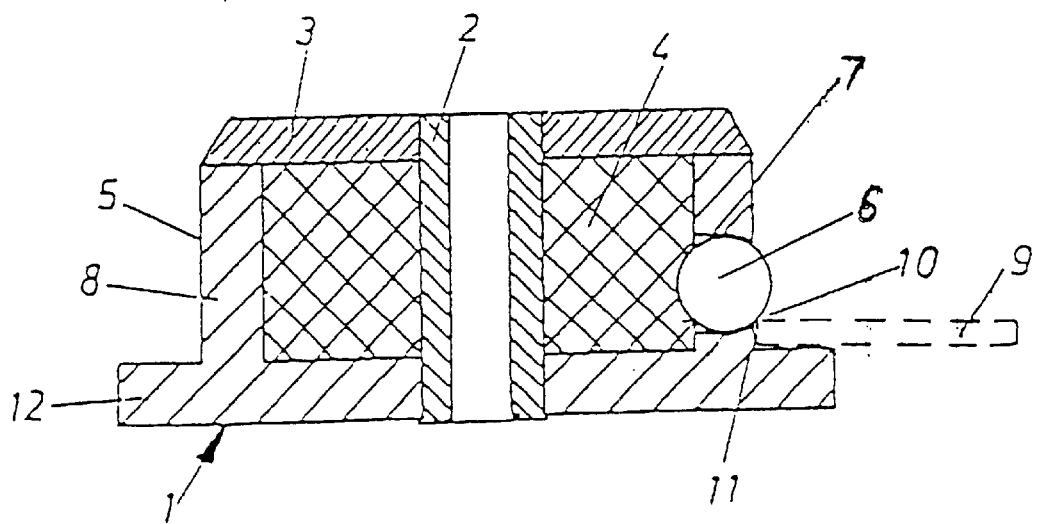
FIG. 2: shows a schematic sketch of the first known embodiment in section on line II—II in FIG. 1, FIG. 3: shows a schematic sketch of a second embodiment of a known mount in plan view.

In a known recording or reproduction apparatus with a mount for disc-type recording media, which mount retains the recording medium with means provided on the disc turntable, a disc turntable corresponding to FIGS. 1 and 2 comprises a pot-shaped body 1, which is pushed onto a bush 2 and is closed off with a disc 3. A spring-elastic body 4 made of rubber or material having the same effect is inserted in the interior of the pot-shaped body 1 and, at the periphery 5 of the pot-shaped body 1, balls 6 are mounted in openings 7 in the wall 8 of the pot-shaped body 1 with an angular spacing of 120 degrees in each case. The openings 7 in the wall 8 are configured conical in such a way that the balls 6 cannot drop out. The balls 6 project beyond the wall 8 both inwardly and outwardly, and are pressed outwards by the spring force of the rubber body 4. During the emplacement of the recording medium 9, which is indicated by dashes, it is necessary to overcome the resistance of the balls 6 which is formed by the rubber body 4. After the recording medium 9 has passed, the balls 6 settle resiliently on the upper edge 10 of the inner centering hole 11 in the recording medium 9. The recording medium 9 is retained by the balls 6 on the plate 12 of the disc turntable. What is disadvantageous is that the force required to overcome the spring resistance formed by the rubber body 4 has the same magnitude in both directions. A force of identical magnitude is necessary for the emplacement and removal of the recording medium 9, which force, however, varies greatly on account of aging of the rubber body 4 and due to environmental influences.

Figure 4:
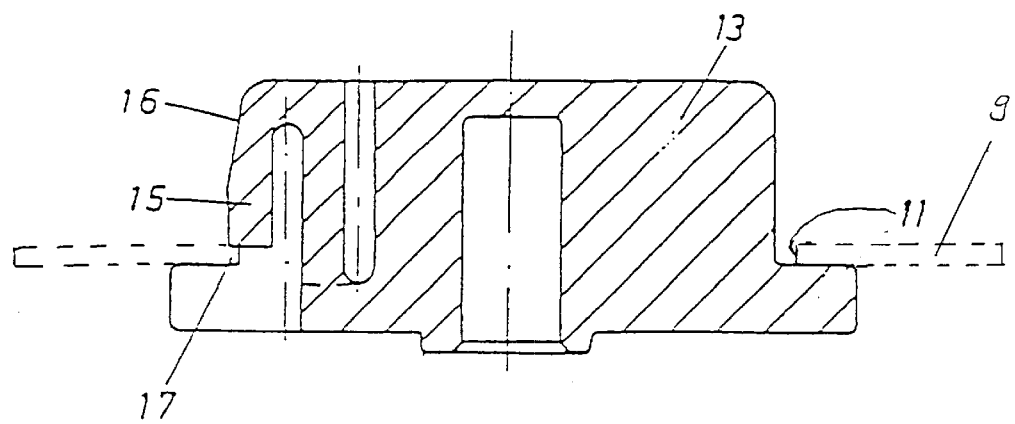
FIG. 4: shows a schematic sketch of the second, known embodiment in section on line IV—IV in FIG. 3, FIG. 5: shows a schematic sketch of a first embodiment according to the invention in section on line I—I in FIG. 6, FIG. 6: shows a schematic sketch of the said first embodiment according to the invention in plan view.
Figure 3:
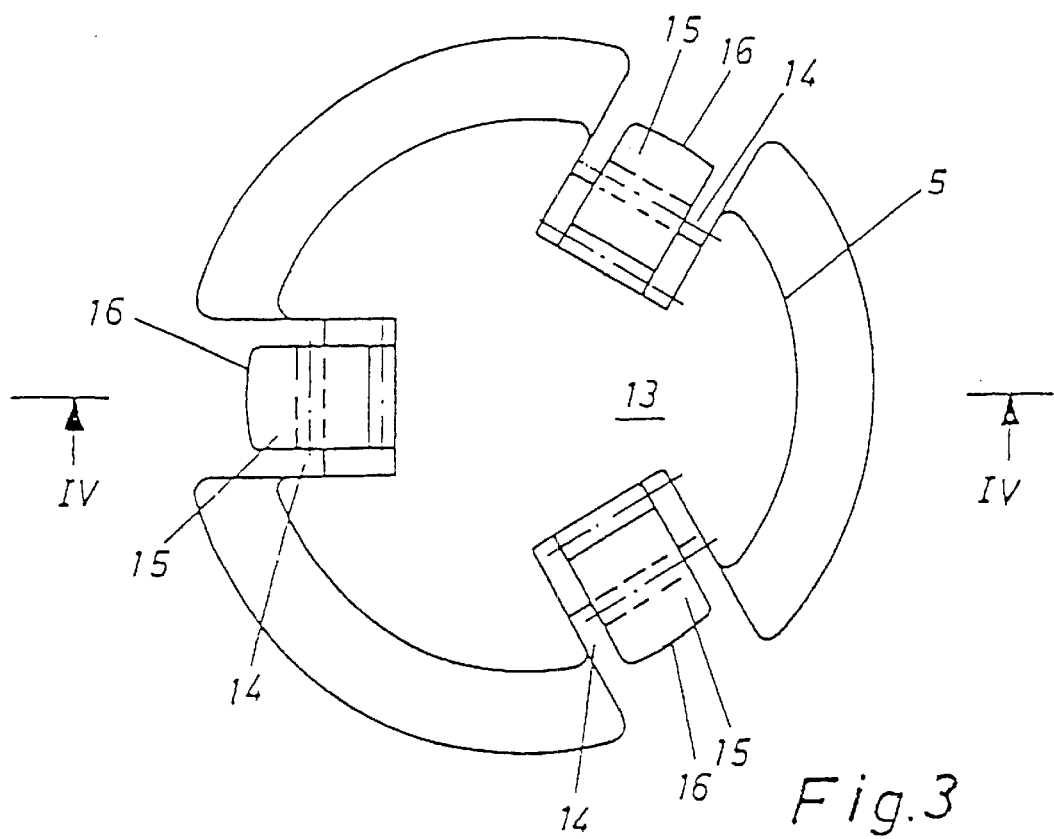

The second, known embodiment according to FIGS. 3 and 4 comprises a plastic injection-molded body 13 with slots 14, which are likewise arranged with an angular spacing of 120 degrees in each case at the periphery 5 and each contain a tongue-shaped spring 15 injection-molded onto the body 13 of the disc turntable. The tongue-shaped springs 15 project freely downwards in the direction of the disc turntable and are slightly beveled on their upper rear part 16. The distance 17 between the tongue-shaped springs 15 and the bearing surface of the disc turntable for the recording medium 9 corresponds approximately to the thickness of the recording medium 9. During the emplacement of the recording medium 9, the tongue-shaped springs 15 first of all spring back and then settle on the recording medium 9 across the recording medium 9.

The recording medium 9 thereby latches fixedly in place on the disc turntable. In order to remove the recording medium 9 from the disc turntable it is then necessary first of all to apply a force directed perpendicularly to the direction of movement. The removal of the recording medium 9 from the disc turntable is thereby disadvantageously rendered more difficult. The mount does not compensate for tolerances of the centering hole 11 in the recording medium 9.

In order to avoid the disadvantages of the known embodiments, a recording or reproduction apparatus with a mount for disc-type recording media 9 is proposed which has a spring element for the purpose of holding the recording medium 9 on the disc turntable, which spring element is formed by a spring toothed disc 18 in conjunction with balls 6 or pot-type springs 19. Reference symbols for essentially identical elements are used consistently in the figures.

Figure 5:
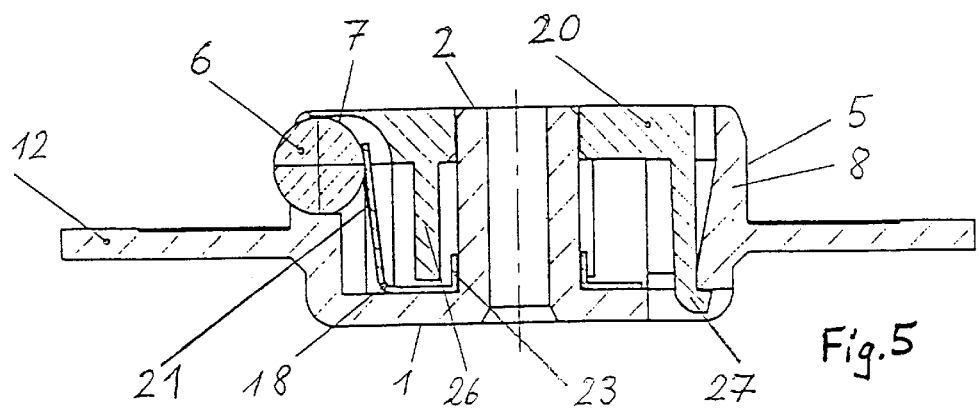
Figure 6:
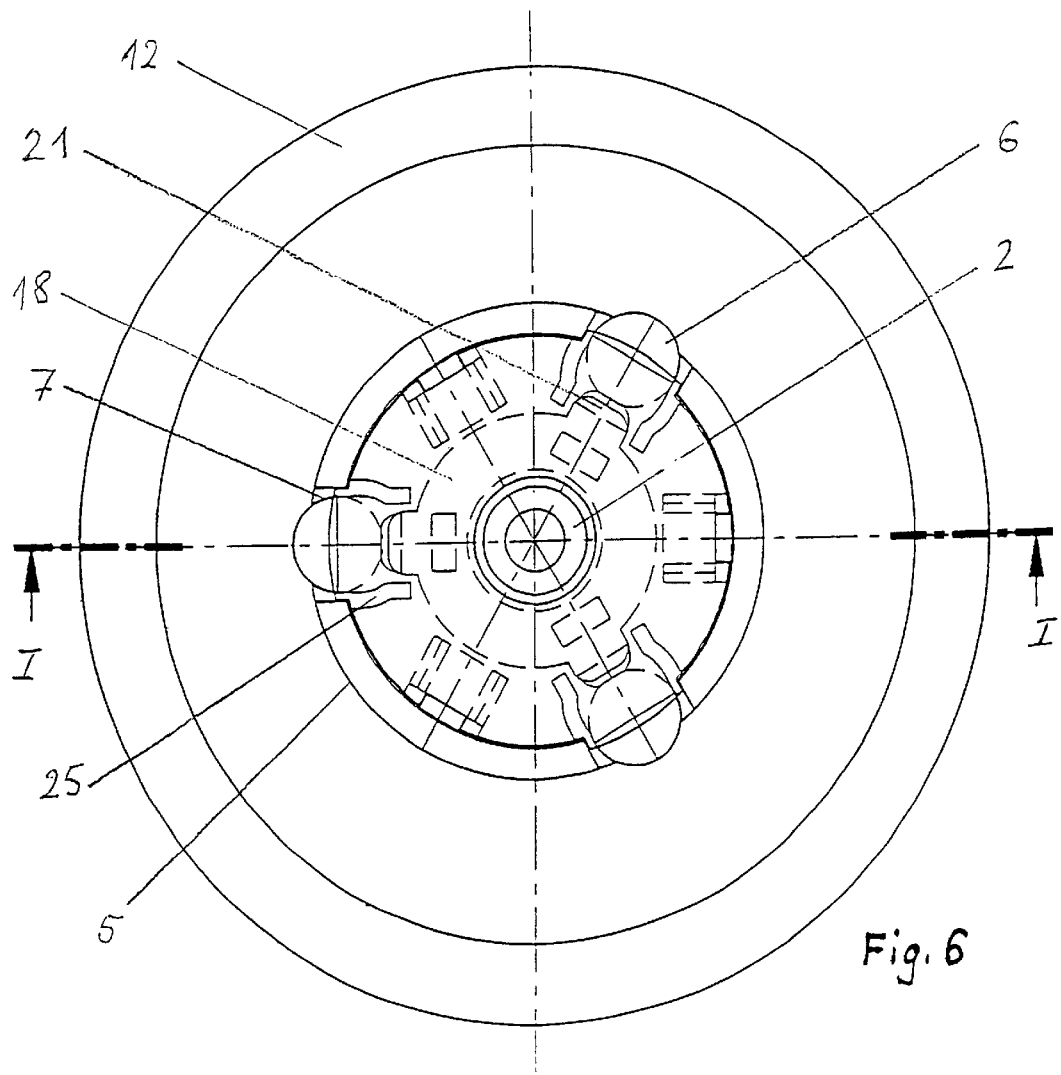

One embodiment according to the invention comprises, in accordance with FIGS. 5 and 6, a pot-shaped body 1, which, with an inner hub, forms a bush 2 and is closed off with a latching disc 20. At the periphery 5 of the pot-shaped body 1, balls 6 are mounted in openings 7 in the wall 8 of the pot-shaped body 1 with an angular spacing of 120 degrees in each case, and the openings 7 in the wall 8 are configured conical in such a way that the balls 6 cannot drop out. A spring toothed disc 18 is arranged in the interior of the pot-shaped body 1 and, in this embodiment, forms a spring element in conjunction with balls 6. The balls 6 project beyond the wall 8 both inwardly and outwardly and are pressed outwards by the spring force of the spring toothed disc 18. For this purpose, the spring toothed disc 18 arranged in the pot-shaped hub of the disc turntable has teeth 21, which are arranged preferably at an angle other than 90 degrees with respect to the base area of the spring toothed disc 18 or a plane formed by the plate 12 of the disc turntable.

Figure 7:
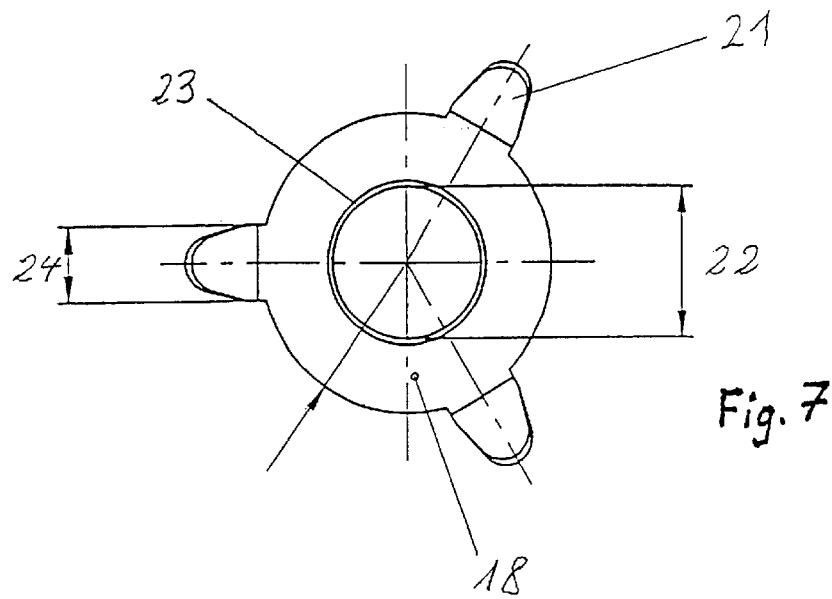
FIG. 7: shows a schematic sketch of a spring toothed disc.

The internal diameter 22 of the spring toothed disc 18, illustrated in FIG. 7, is matched to the external diameter of the inner hub of the pot-shaped body 1 and carries a collar 23, by means of which the spring toothed disc 18 is guided on the inner hub, in order to prevent the spring toothed disc 18 from tilting or canting. The teeth 21 of the spring toothed disc 18 are rounded at their ends and their width 24 is narrower than pockets in which the balls 6 are arranged. The pockets are formed by holding lugs 25 proceeding from the openings 7 in the wall 8 of the pot-shaped body 1. They are opened slightly during the mounting of the balls 6 and hold the balls 6 in an advantageous manner during the mounting of the spring toothed disc 18, the teeth 21 of which likewise engage in these pockets. The spring toothed disc 18 is thereby oriented in a manner secure against rotation in the pot-shaped body 1 and ensures, in conjunction with holding-down devices 26 arranged on the latching disc 20 which closes off the pot-shaped body 1, that a spring force is exerted on the balls 6 by the spring toothed disc 18. The latching disc 20 is oriented on the inner hub of the pot-shaped body 1 and is provided with latching webs 27, which engage in the bottom of the pot-shaped body 1. The holding device has a small number of structural parts and requires a low outlay on assembly. Plastic capable of being injection-molded is preferably used as the material for producing the pot-shaped body 1 and the latching disc 20. The spring toothed disc 18 is preferably produced from phosphor-bronze or spring strip steel in a stamping and bending process and consequently ensures a constant spring force even over a long period of time and to the greatest possible extent independently of environmental influences. The components of the spring force by which a recording medium 9 (not illustrated in FIGS. 5 and 6) is held on the plate 12 and oriented with respect to the periphery are determined by the angle at which the tooth 21 of the spring toothed disc 18 bears on the balls 6. As a result, a force component provided for centering the recording medium 9 on the disc turntable and a holding force which presses a recording medium 9 onto the disc turntable are advantageously configured differently. Furthermore, an emplacement force that is to be applied to the disc turntable in the direction of movement also advantageously differs from the force which holds a recording medium 9 on the disc turntable.

Figure 8:
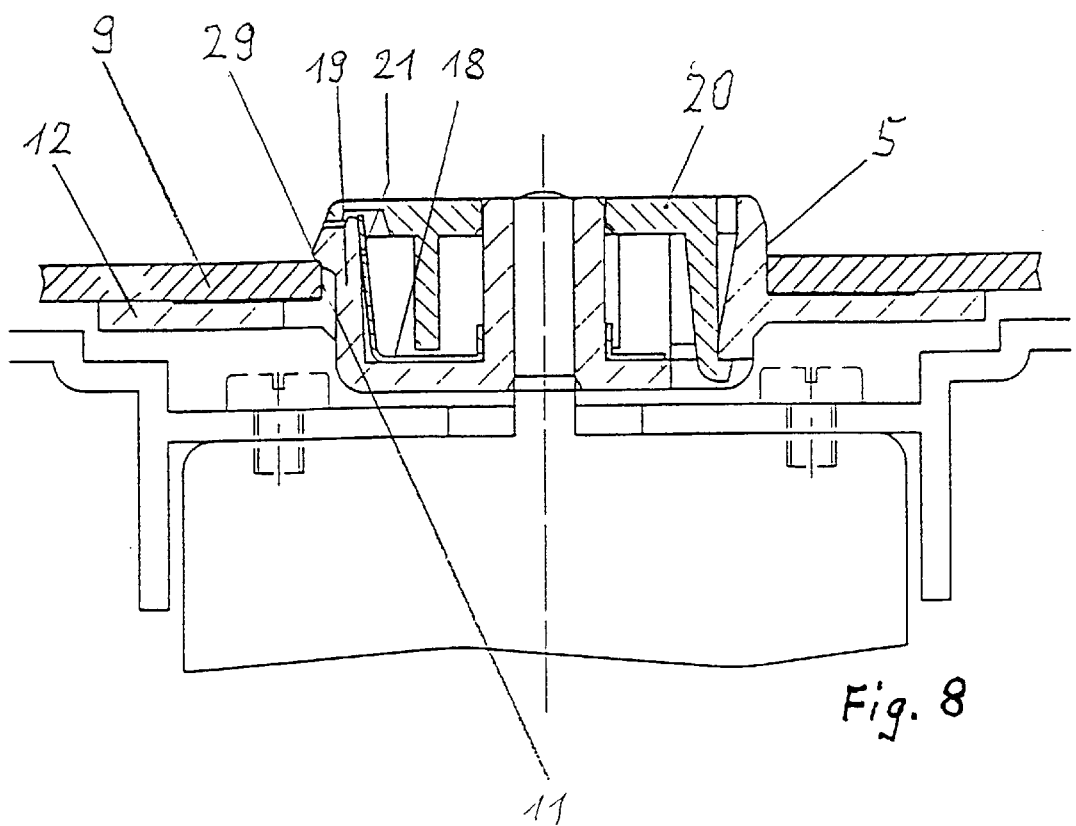
FIG. 8: shows a schematic sketch of a second embodiment according to the invention in section on line III—III in FIG. 10 with a recording medium having been emplaced.
Figure 9:
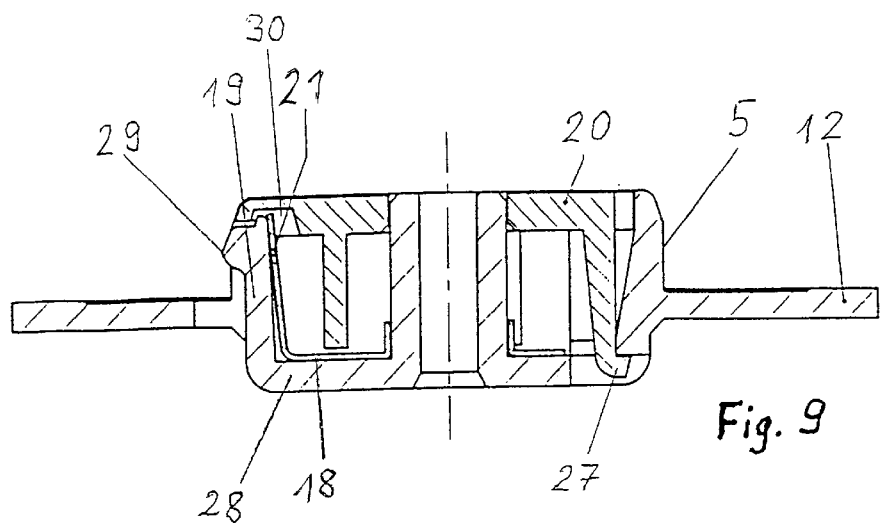
FIG. 9: shows a schematic sketch of the second embodiment according to the invention in section on line III—III in FIG. 10 without a recording medium having been emplaced.
Figure 10:
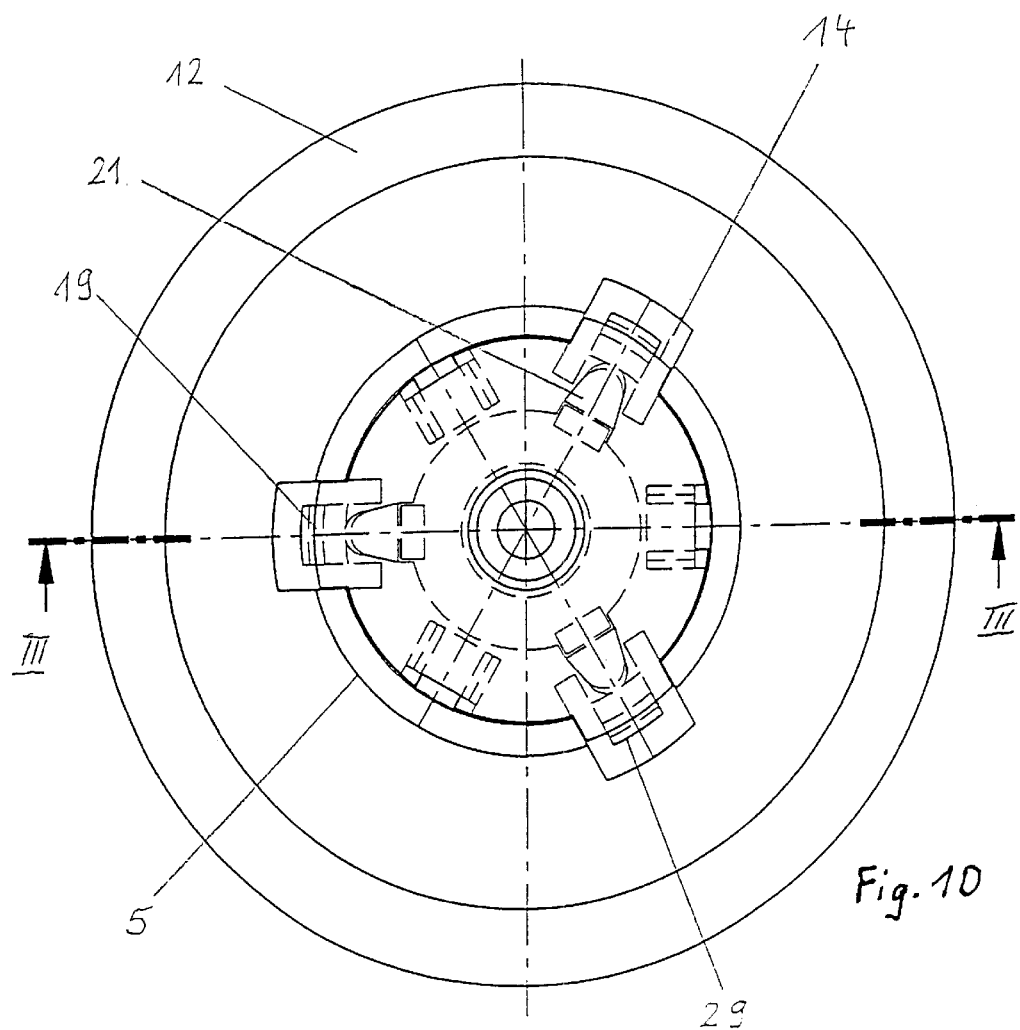
FIG. 10: shows a schematic sketch of the second embodiment according to the invention in plan view.

A second embodiment according to the invention is illustrated in FIGS. 8 to 10. It comprises a plastic body 28 having pot-type springs 19. In accordance with this embodiment, the pot-type springs 19, which can even form a spring element independently, are additionally supported by the spring toothed disc 18 already mentioned above. As illustrated in FIG. 10, the pot-type springs 19 and the teeth 21 of the spring toothed disc 18 are likewise preferably arranged with an angular spacing of 120 degrees in each case at the periphery of the hub of the disc turntable, the said hub penetrating through a centering hole 11 in the recording medium 9. Slots 14 are provided at the periphery 5 (illustrated in FIG. 10) of the hub of the disc turntable, between which slots, as illustrated in FIG. 9, are arranged pot-type springs 19 proceeding from the bottom of the pot-shaped plastic body 28. At their ends, the pot-type springs 19 each carry an outwardly directed lug 29, which preferably has a different inclination in the direction to and from the plate 12 which receives the recording medium 9. The very fact that the lug 29 has the different inclination in the direction to and from the disc turntable means that a force required for the emplacement of the recording medium 9 is smaller than a holding force which holds a recording medium 9 on the disc turntable. During the emplacement of the recording medium 9, the tongue-shaped pot-type springs 19 initially spring back and then settle with the lug 29 on the recording medium 9. The recording medium 9 consequently latches into place on the disc turntable in a manner allowing it to be removed. Since the lugs 29 of the pot-type springs 19 also spring back during the removal of the recording medium 9, no force directed perpendicularly to the direction of movement has to be additionally applied for the purpose of removing the recording medium 9, as a result of which the removal of the recording medium 9 from the disc turntable is significantly facilitated by comparison with known embodiments. The lugs 29 of the pot-type springs 19 both hold the recording medium 9 on the disc turntable and center it with respect to the periphery 5 of the hub. Tolerances of the centering hole 11 in the recording medium 9 are compensated for. Consequently, the plastic body 28 with pot-type springs 19 having lugs 29 is already fundamentally suitable as an advantageous mount for disc-type recording media 9 in recording or reproduction apparatuses. As a result, such a disc turntable with a mount for the recording media 9 can advantageously be embodied in one piece, thereby reducing a tolerance chain which always occurs when there are a plurality of individual parts. Disc turntables are provided which are produced in one piece despite the pot-shaped hub. In contrast to the disc turntable with pot-shaped hub as illustrated in FIG. 2, the bearing surface for the recording medium 9, the centering hub for the recording medium 9 and the bush 2 for receiving the drive spindle of the disc turntable are integrated in one part, thereby reducing the tolerance chain.

A further advantage of the exemplary embodiments according to the invention resides in the small structural height, which cannot be achieved, in principle, with a known one-piece disc turntable in accordance with FIG. 4, since the tongue-shaped springs proceed from the head of the hub and are formed by undercut ends. The pot-type springs 19 can, in principle, be realized with a smaller structural height.

In order to further improve the spring, holding and centering properties, the spring toothed disc 18 already mentioned is additionally provided in the pot-shaped plastic body 28. In this case, the configuration and arrangement of the spring toothed disc 18 are identical to the first embodiment according to the invention. The pot-type springs 19 likewise have pockets which are directed towards the center point of the disc turntable and into which teeth 21 of the spring toothed disc 18 engage. The teeth 21 of the spring toothed disc 18 each bear on the inner wall of the pot-type spring 19 at an acute angle on the rear side of the lug 29 and thereby support the spring force proceeding from the pot-type spring 19. Cutouts 30 are provided in a latching disc 20, which forms the cover of the pot-shaped plastic body 28 and is anchored with latching webs 27 in the bottom of the pot-shaped plastic body 28, into which cutouts engages a shoulder at that end of the pot-type spring 19 which carries the lug 29. With the cutout 30 forming a stop for the pot-type spring 19, a pot-type spring 19 that is under prestress is advantageously formed. For this purpose, the elastic pot-type springs 19 of the plastic body 28 are produced at an angle to the bottom of the pot-shaped plastic body 28 which exceeds 90 degrees, and, during the mounting of the latching disc 20 which forms the cover, are forced back until they latch into the cutouts 20 thereof. With the prestress, a large spring force of the pot-type springs 19 is advantageously achieved in spite of small spring excursions, which spring force, for a number of applications, is already large enough to hold and to center the recording medium 9 on the disc turntable even without the support by the spring toothed disc

18. With a basic construction, it is thereby possible to produce different disc turntables, which exert on the recording medium 9 a holding and centering force that corresponds to the respective purpose of application. In this case, the purpose of application is determined in particular by the rotational speed range and the unbalance of the disc turntable and of the recording media 9.

In the case of the embodiment illustrated in FIGS. 8 to 10, it is possible to use either already prestressed pot-type springs 19 or else pot-type springs 19 which have no prestress, since a prestress can be generated by the spring toothed disc. The advantage of a prestress that has not already been effected by the angle during the production of the pot-type springs 19 resides in the fact that embodiments of this type exhibit smaller variations in the spring force, since prestressed plastics generally exhibit greater fatigue phenomena than, by way of example, a spring produced from a phosphor-bronze.

What is claimed is:

1. Recording or reproduction apparatus with a mount for disc-type recording media, which mount retains the recording media with means provided on the disc turntable, comprising:

a spring element formed by a spring toothed disc arranged inside the mount for holding and centering the recording medium on the disc turntable and said spring element has teeth oriented a an angle to a plane formed by the disc turntable to generate a prestress on balls or pot-type springs for holding and centering the recording medium on the disc turntable with an emplacement force not equal to the holding force.

2. Recording or reproduction apparatus according to claim 1, wherein the spring toothed disc has teeth, which are angled away in one direction by less than 90 degrees from a plane formed by the surface of the spring toothed disc.

3. Recording or reproduction apparatus according to claim 1, wherein the spring toothed disc has teeth with a width engaging in pockets of the spring elements.

4. Recording or reproduction apparatus according to claim 1, wherein the spring toothed disc has a hole with a collar by which the spring toothed disc is guided on an inner hub of a pot-shaped body.

5. Recording or reproduction apparatus according to claim 1, wherein the spring toothed disc is produced from phosphor bronze.

6. Recording or reproduction apparatus according to claim 1, wherein the spring toothed disc is arranged in a hub of the disc turntable, which hub penetrates through a centering hole in the recording medium.

7. Recording or reproduction apparatus according to claim 1, wherein a pot-shaped body of the mount is closed off with a cover formed by a latching disc.

8. Recording or reproduction apparatus according to claim 1, wherein the spring toothed disc is held in the pot-shaped body by a holding-down device, which is arranged on a cover formed by a latching disc.

9. Recording or reproduction apparatus with a mount for disc-type recording media, which mount retains the recording medium with means provided on the disc turntable comprising a disc turntable with a pot-shaped hub wherein a bearing surface for the recording medium, a centering hub for the recording medium and a bush for receiving the drive spindle of the disc turntable are designed integrally, integrated in one part.

* * * * *